United States Patent
Ökvist et al.

(10) Patent No.: US 10,531,335 B2
(45) Date of Patent: Jan. 7, 2020

(54) METHOD AND ARRANGEMENT FOR CELL COMBINATION

(71) Applicant: Telefonaktiebolaget LM Ericsson (publ), Stockholm (SE)

(72) Inventors: Peter Ökvist, Luleå (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 186 days.

(21) Appl. No.: 15/327,638

(22) PCT Filed: Sep. 12, 2014

(86) PCT No.: PCT/SE2014/051057
§ 371 (c)(1),
(2) Date: Jan. 19, 2017

(87) PCT Pub. No.: WO2016/039677
PCT Pub. Date: Mar. 17, 2016

(65) Prior Publication Data
US 2017/0201907 A1 Jul. 13, 2017

(51) Int. Cl.
*H04W 28/08* (2009.01)
*H04W 28/02* (2009.01)
(Continued)

(52) U.S. Cl.
CPC ........... *H04W 28/08* (2013.01); *H04L 41/14* (2013.01); *H04L 43/0876* (2013.01);
(Continued)

(58) Field of Classification Search
CPC . H04W 28/08; H04W 28/0284; H04W 16/32; H04W 24/02; H04L 41/14; H04L 43/0876
See application file for complete search history.

(56) References Cited

U.S. PATENT DOCUMENTS

| | | |
|---|---|---|
| 8,331,236 B2 | 12/2012 | Cavalli et al. |
| 2002/0016170 A1 | 2/2002 | Sabat, Jr. et al. |

(Continued)

FOREIGN PATENT DOCUMENTS

| | | |
|---|---|---|
| EP | 1739988 A1 | 1/2007 |
| JP | 2011049813 A | 3/2011 |

(Continued)

OTHER PUBLICATIONS

Author Unknown, "Technical Specification Group Radio Access Network; Study on UMTS heterogeneous networks (Release 12)," Technical Report 25.800, Version 12.1.0, 3GPP Organizational Partners, Dec. 2013, 165 pages.

(Continued)

*Primary Examiner* — Robert C Scheibel
(74) *Attorney, Agent, or Firm* — Sage Patent Group

(57) ABSTRACT

A method for assisting in cell combination management in a cellular communication system is presented. The method comprises obtaining of network statistics, comprising statistics associated with pairs of cells as well as cell loads. At least one candidate cell combinations selected. The candidate cell combination is a combination of cells for which a mobility measure deduced from the mobility statistics for pairs of cells participating in the combination of cells exceeds a first predetermined threshold. A total load capacity is determined for each of the candidate cell combinations. A cell combination procedure is recommended for a first cell combination. A cell combination, for which a load margin exceeds zero, is allowed to be chosen as the first cell combination. The load margin is a difference between the determined total load capacity and a sum of the cell loads. A network node performing such method is disclosed.

15 Claims, 9 Drawing Sheets

(51) Int. Cl.
*H04L 12/24* (2006.01)
*H04W 24/02* (2009.01)
*H04W 16/32* (2009.01)
*H04L 12/26* (2006.01)
*H04W 36/00* (2009.01)

(52) U.S. Cl.
CPC ........... *H04W 16/32* (2013.01); *H04W 24/02* (2013.01); *H04W 28/0284* (2013.01); *H04W 36/0083* (2013.01)

(56) References Cited

U.S. PATENT DOCUMENTS

| | | | |
|---|---|---|---|
| 2009/0270106 A1* | 10/2009 | Matsunaga | H04W 28/08 455/445 |
| 2011/0096736 A1 | 4/2011 | Kwon et al. | |
| 2011/0111782 A1* | 5/2011 | Aoyagi | H04W 24/00 455/508 |
| 2012/0282934 A1* | 11/2012 | Simonsson | H04B 7/024 455/446 |
| 2014/0162682 A1 | 6/2014 | Tafreshi et al. | |
| 2015/0163723 A1* | 6/2015 | Pandey | H04W 16/10 370/252 |

FOREIGN PATENT DOCUMENTS

| | | |
|---|---|---|
| WO | 9812885 A2 | 3/1998 |
| WO | 2010019907 A1 | 2/2010 |
| WO | 2010024743 A1 | 3/2010 |
| WO | 2012126514 A1 | 9/2012 |
| WO | 2012150881 A1 | 11/2012 |
| WO | 2014002320 A1 | 1/2014 |
| WO | 2014012588 A1 | 1/2014 |
| WO | 2014024438 A1 | 2/2014 |
| WO | 2014090032 A1 | 6/2014 |

OTHER PUBLICATIONS

International Search Report and Written Opinion for International Patent Application No. PCT/SE2014/051057, dated Jun. 26, 2015, 15 pages.

European Search Report for European Patent Application No. 14901744.4, dated Sep. 8, 2017, 3 pages.

International Preliminary Report on Patentability for International Patent Application No. PCT/SE2014/051057, dated Mar. 23, 2017, 12 pages.

* cited by examiner

METHOD AND ARRANGEMENT FOR CELL COMBINATION

This application is a 35 U.S.C. § 371 national phase filing of International Application No. PCT/SE2014/051057, filed Sep. 12, 2014, the disclosure of which is incorporated herein by reference in its entirety.

TECHNICAL FIELD

The proposed technology generally relates to methods, network nodes, computer programs and computer program carriers for assisting in cell combination management in a cellular communication system.

BACKGROUND

In, for example, highly loaded train platform cells there are occasionally reasons for combination of platform cells into larger cell clusters/groups. In particular, large groups of users simultaneously moving might create more control signaling per time instance, and thus cause heavier load on involved network nodes. Combining/clustering of adjacent cells will reduce the load associated with communication directly or indirectly between the cells or between the user equipment and neighboring cells.

With Long Term Evolution (LTE) release 8 User Equipment (UE) the cell can be combined to a transmitting the same information from all the transmission points in the cell. This is also called "single frequency network" and is typically used along roads and railroads.

Combining cells reduces the number of cells, the area splitting gain and thereby also reduces capacity. In LTE release 10 a new transmission mode 9 (TM9) is introduced. TM9 supports UE specific demodulation reference symbols (DMRS) and Channel State Information Reference Signal (CSI-RS) enabling spatial multiplexing within the combined cell.

Traditionally, there has been a one-to-one correspondence between antenna/transmission points and cells leaving limited possibilities for cell combinations. Distributed antennas solutions to obtain good coverage with equal signal levels have emerged where many transmission points are used. Multiple transmission points are often combined/clustered to/as single cells or similar. Examples are active Distributed Antenna System (DAS), Radio Dot System (RDS) and small cells Remote Radio Unit (RRU) clusters.

In the published U.S. Pat. No. 8,331,236 B2, a method to balance traffic load between nearby LTE/WiMAX cells grouped into inner and border constellations is disclosed.

Within Coordinated Multi Point (CoMP) there are several methods suggested on how to group UEs and transmission points to be used for joint transmission and reception. For example, in the published international patent application WO 2012/150881 a distributed method how to interact between nodes to combine antennas and transmission points controlled by different nodes is described. And in the published international patent application WO 2012/126514 a method on grouping UEs and transmission points for CoMP transmission based on path loss is described.

Even though there are advanced CoMP features that in theory can avoid cell split between any transmission points the size of a CoMP cell is in practice limited due to signaling and processing capabilities. Also, existing combined cell solution based on LTE transmission modes 9 and 10 do not reach the capacity as of individual cells due to increased overhead.

Combining all cells (with sufficient backhaul) will reduce capacity. This is true not only for LTE Release 8. DMRS increases overhead and reduces capacity and peak bitrate.

External input from e.g. vehicle traffic control system is described for channel allocation in the published US patent application US 2002/0016170 A1, but no solution on combined cell and how cell-id should be broadcasted is described.

SUMMARY

It is an object to provide improved assistance for cell combination management in cellular communication systems having high user equipment mobility between the cells.

This and other objects are met by embodiments of the proposed technology.

In general words, according to a first aspect, there is provided a method for assisting in cell combination management in a cellular communication system. The method comprises obtaining of network statistics. The network statistics comprises at least mobility statistics associated with pairs of cells in the cellular communication system as well as cell loads of cells in the cellular communication system. At least one candidate cell combination is selected. The candidate cell combination is a combination of cells for which a mobility measure deduced from the mobility statistics for pairs of cells participating in the combination of cells exceeds a first predetermined threshold. A total load capacity is determined for each of the at least one candidate cell combination. A cell combination procedure is recommended for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination.

According to a second aspect, there is provided a network node in a cellular communication system configured to assist in cell combination management. The network node is configured to obtain network statistics. The network statistics comprises at least mobility statistics associated with pairs of cells in the cellular communication system as well as cell loads of cells in the cellular communication system. The network node is configured to select at least one candidate cell combination. The candidate cell combination is a combination of cells for which a mobility measure deduced from the mobility statistics for pairs of cells participating in the combination of cells exceeds a first predetermined threshold. The network node is configured to determine a total load capacity for each of the at least one candidate cell combination. The network node is configured to recommend a cell combination procedure for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination.

According to a third aspect, there is provided a computer program comprising instructions, which when executed by at least one processor, cause the at least one processor to obtain network statistics for a cellular communication system. The network statistics comprises at least mobility statistics associated with pairs of cells in said cellular communication system as well as cell loads of cells in the cellular communication system. The computer program further comprises instructions, which when executed by the at least one processor, cause the at least one processor to select at least one candidate cell combination. The candidate cell combination is a combination of cells for which a mobility measure deduced from the mobility statistics for pairs of cells participating in the combination of cells exceeds a first predetermined threshold. The computer program further comprises instructions, which when executed by the at least one processor, cause the at least one processor to determine a total load capacity for each of the at least one candidate cell combination and to recommend a cell combination procedure for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination.

According to a fourth aspect, there is provided a carrier comprising the computer program of the third aspect, wherein the carrier is one of an electronic signal, an optical signal, an electromagnetic signal, a magnetic signal, an electric signal, a radio signal, a microwave signal, or a computer-readable storage medium.

According to a fifth aspect, there is provided a network node in a cellular communication system configured to assist in cell combination management. The network node comprises an obtaining module for obtaining network statistics. The network statistics comprises at least mobility statistics associated with pairs of cells in the cellular communication system as well as cell loads of cells in the cellular communication system. The network node further comprises a selecting module for selecting at least one candidate cell combination. The candidate cell combination is a combination of cells for which a mobility measure deduced from the mobility statistics for pairs of cells participating in the combination of cells exceeds a first predetermined threshold. The network node further comprises a determining module for determining a total load capacity for each of the at least one candidate cell combination. The network node further comprises a recommending module for recommending a cell combination procedure for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination.

An advantage of the proposed technology is that it reduces the amount of handover between (small) cells, which in turn will reduce related signaling load over X2 interface and potentially improve HO-failure-related KPIs.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the impact of handover activities. Mobility of UE between neighboring cells causes handover (HO) activities. The UE has to keep track of neighboring cells presenting a reasonably high signal strength. Moreover, when an actual HO is to be performed, a lot of control signaling, between the base stations of the involved cells as well as between the UE and the respective cells, has to be performed. The handover activities therefore occupy some control signal resources and may in some cases lead to HO-failure, i.e. risk for dropped connections.

Avoiding or at least reducing the need for handover will thus reduce signaling load between involved base stations, and with less handovers there are fewer handovers that potentially can fail (by some reason), hence potentially improving HO-failure related Key Performance Indicators (KPIs).

Furthermore, one drawback with cell split is the cost of handover. There is a probability of handover drop with severe Quality of Experience (QoE) degradation for the users. For example, also a successful handover in LTE results in a 40-60 ms connection interruption which depending on service can impact QoE negatively. So there is a need for a solution forming best cell split and division of transmission points into cells with an overall QoE view including handover impact.

One approach to lower the impact of the HO activity is to utilize mobility statistics to identify cells to combine/cluster to minimize handover and handover failures. Existing solutions do not consider mobility and handover statistics as input to cell combination schemes and corresponding cell merges, and today's solutions will therefore not construct clusters that targets reduction of handovers. For example, in the published international patent application WO 2012/150881, the published international patent application WO 2012/126514 or any other known CoMP grouping method the handover statistics is not taken into account. This is also rather natural since within a set of CoMP enabled transmission points and antennas, cell split and handover is not considered at all.

By also taking cell load into account, sufficient capacity is ensured to be maintained and it is also possible to select a suitable trade-off between handover performance and user throughput maximizing user quality of experience.

Figure 1A:
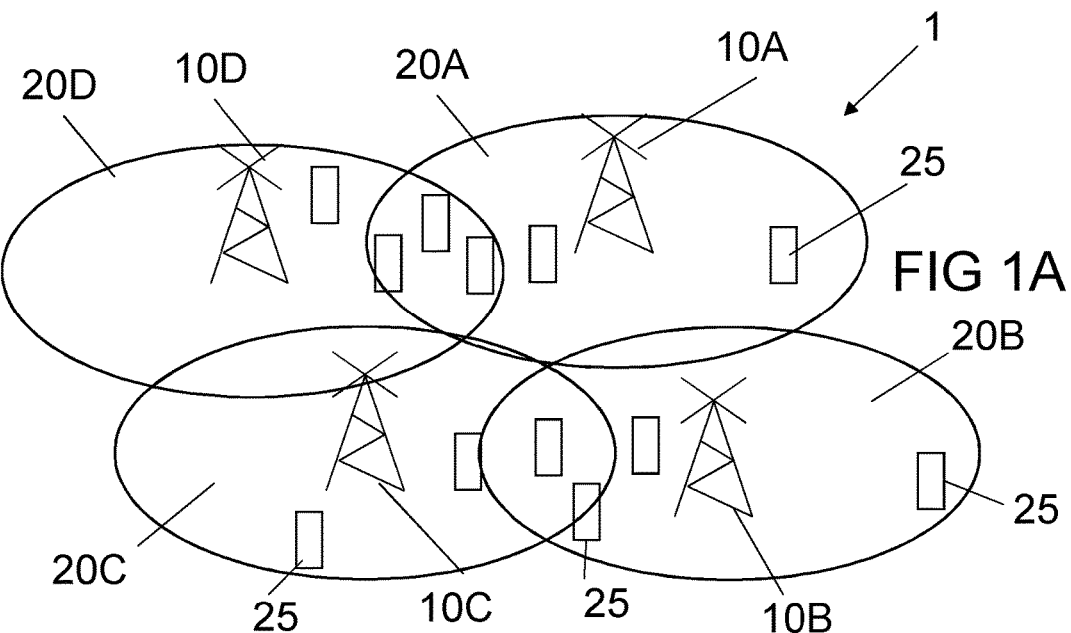
FIGS. 1A and 1B are schematic illustrations of cellular systems before and after cell combination, respectively.
Figure 1B:
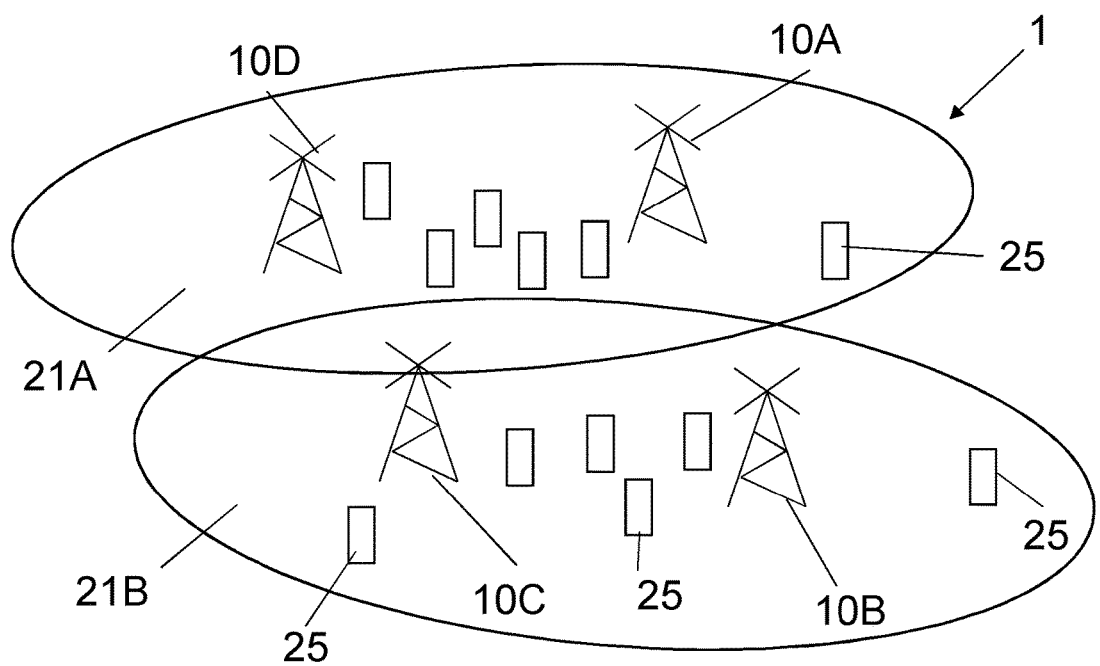

FIGS. 1A and 1B schematically illustrate a cell combination. A cellular communication system 1 comprises a number of base stations 10A-D or transmission points. Each base station 10A-D has its own communication resource, e.g. frequency or code, by which it communicates with UEs 25. Thereby, each base station 10A-D has an associated cell 20A-D. In the present example, there are relatively many UEs 25 in the area between the cells 20A and 20 D as well as in the area between cells 20B and 20C. In particular if these UEs 25 are moving, it is probable that many HO activities have to be initiated, causing increased load in the cells.

FIG. 1B illustrates a scenario, when a cell combining has been performed. The base stations 10A and 10D now are transmission points of one and the same communication resource, and therefore spans a common combined cell 21A. Similarly, the base stations 10B and 10C now are transmission points of one and the same communication resource, and therefore spans a common combined cell 21B. All UEs 25 are now far from a cell border and HO activities are unlikely. However, the cell combination also has other effects. Since the base stations share the same communication resource, the total load capacity of the system is lower compared with the situation in FIG. 1A. However, the UEs 25 are located further away from neighbouring cells, which means that also the interference from neighbouring cells is reduced. The user throughput and user quality of experience may thereby be improved.

Figure 2:
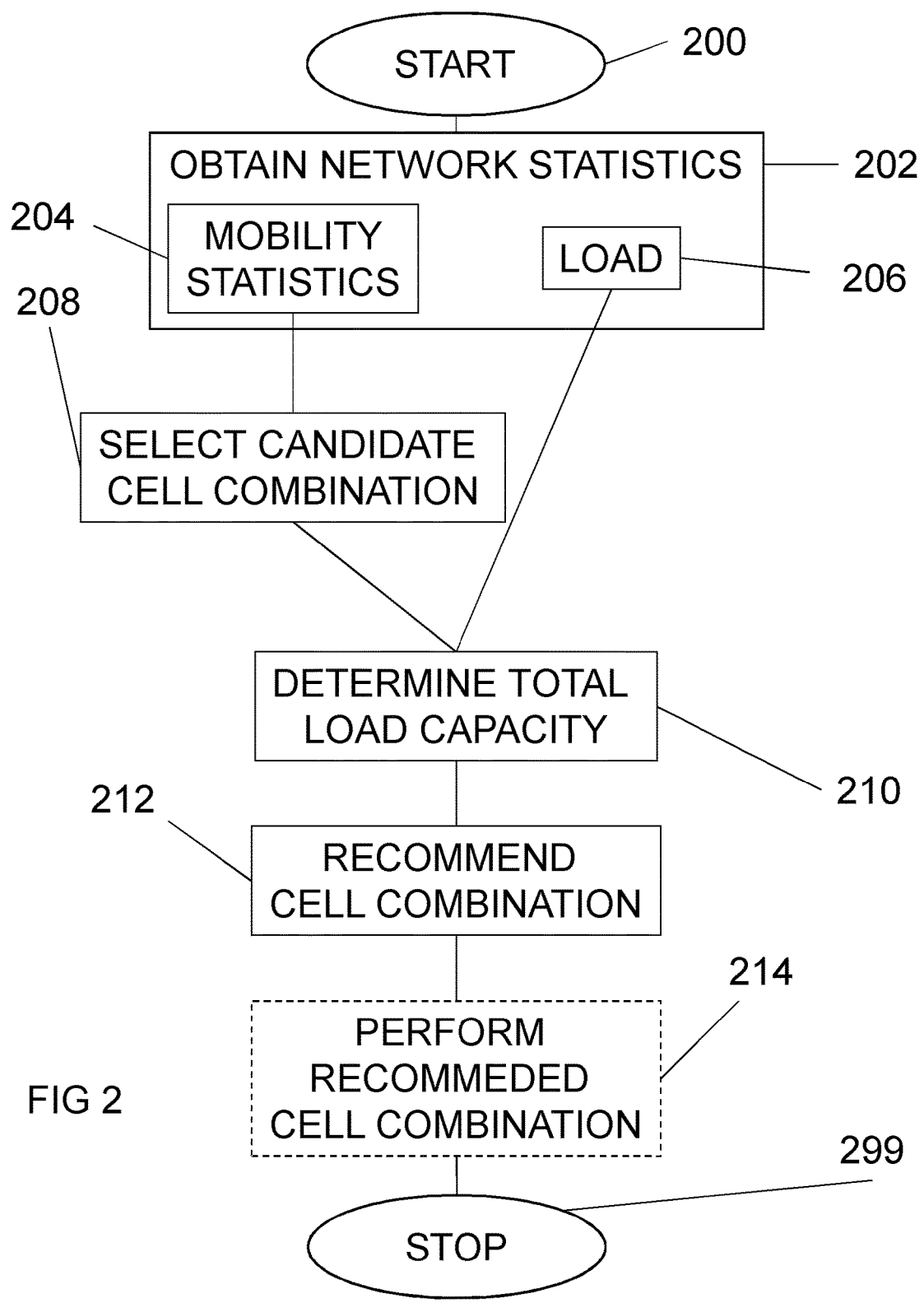
FIG. 2 is a flow diagram of steps of an embodiment of a method for assisting in cell combination management.

FIG. 2 illustrates a flow diagram of steps of an embodiment of a method for assisting in cell combination management in a cellular communication system. The process starts in step 200. In step 202, network statistics is obtained. The network statistics comprising mobility statistics 204 associated with pairs of cells in the cellular communication system as well as cell loads 206 of cells in the cellular communication system. In one particular embodiment, the step 202 of obtaining network statistics comprises collecting network statistics from different network nodes in the cellular communication system. In another particular embodiment, the step 202 of obtaining network statistics comprises measuring of network statistics.

In step 208, at least one candidate cell combination is selected. The candidate cell combination is a combination of cells for which a mobility measure deduced from the mobility statistics for pairs of cells participating in the combination of cells exceeds a first predetermined threshold. The mobility measure will be described more in detail further below. This step can thus in other words be seen as a first gathering of possible cell combinations that could be interesting for further exploration. In a particular embodiment, one may stop the searching for candidates when a certain number of candidates has been found. In the most basic particular embodiment, one may even stop after finding one candidate. In other embodiments, one may investigate all combination possibilities of combinations of a certain group of cells. In one embodiment, the cell combinations are combinations of at least two cells in the cellular communication system, but may also comprise more than two cells. In step 210, a total load capacity for each of the at least one candidate cell combination is determined. In step 212, a cell combination procedure is recommended for a first cell combination out of the candidate cell combinations. A cell combination, for which a load margin exceeds zero, is allowed to be chosen as the first cell combination. The proposed cell combination, i.e. the "first" cell combination thus has to fulfill certain criteria. A first criteria is that the cell combination is a candidate cell combination, i.e. that the mobility statistics is high enough to motivate a change. However, in order to be allowed to be selected as the first cell combination, also other requests have to be fulfilled. In this embodiment, one such sufficient condition is specified, i.e. that the load margin exceeds zero. Note that there might be other sufficient conditions as well.

In a particular embodiment, and in further particular if the method for assisting in cell combination management in a cellular communication system is performed in the same network node as is responsible for cell combination activities, the process continues with a step 214, in which the cell combination procedure is performed according to the recommendation. The load margin is a difference between the determined total load capacity for the first cell combination and a sum of the cell loads of cells of the first cell combination.

The process ends in step 299.

The process of FIG. 2 is illustrated as a flow diagram. However, some of the steps may be performed simultaneously or even in another order. Anyone skilled in the art realizes which steps that have to be completed before other steps are started and which steps can be performed at least partly overlapping.

The most obvious example of mobility statistics is handover statistics.

In one embodiment, handover statistics is therefore collected for the relation between each cell pair. Handover statistics can e.g. be the number of handovers which indicates the mobility between the cell pair and also the handover signaling load. In many cases, this measure is also strongly correlated with handover failure and the impact from handover on end-user quality. Cells with largest number of handover between them are then considered as good candidates to be combined into one cell. A related handover statistics is the handover rates, i.e. the number of HOs per time unit and per UE or cell.

Also handover statistics more directly related to handover load or experienced user quality can be used, such as:

Number of handover drops;

Handover air interface signaling load, Radio Resource Control (RRC) and/or random access;

X2 signaling load; and

Handover interruption time

The selection of candidates is determined by a first predetermined threshold. How the actual threshold is constructed depends on the character of the mobility statistics that is measured and/or received. In one embodiment, cell combinations of cells involved with more than a given number of handovers in any direction are collected as candidate cell combinations. Such an approach will only leave out cells that have a generally low number of HOs. In an alternative embodiment, candidate cells combinations are those combinations involving cell pairs that have a given handover rate.

To maintain sufficient capacity, load in the combined cell load should be taking into account. The load can be measured as any combination of; number of UEs, data load and cell/channel utilization.

Load thresholds can be used as stop criteria for cell combination. A "load margin" can be defined as a difference between the determined or estimated total load capacity for the cell combination in question and a sum of the cell loads of cells that are to be combined into that cell combination. In one embodiment, if this load margin is larger zero that cell combination can without further exploration of any other benefits of combination be allowed for a combination process. In a non-limiting example, cell combination processes can be allowed to continue in this way e.g. until a channel utilization of 80% is reached. As being discussed further below, additional benefits from the combination process, such as reduced interference and reduced control signaling load, may further improve the load situation. This also means that cell combinations that a-priori does not seem to beneficial, e.g. having a negative load margin, anyway can be allowed.

Load and handover statistics can be combined to find (a more) optimal user quality of service. This can be done with cost functions. For example reduction in handover interruption time can be weighted towards user throughput given known quality of experience functions. Also more advanced quality of experience measures could potentially be used directly as input instead of or in combination with load and handover statistics.

Handover statistics has been used as the mobility statistics in the embodiments presented here above. However, there are other mobility statistics that can be used for the similar purpose. For example, mobile speed, Doppler shift and pre-coder shift are quantities that could be used to characterize the mobility of UEs, and statistics of such quantities can be utilized in an analogue manner as handover statistics.

In one embodiment, user equipment reported signal strength and cell relation are also utilized for estimating the possible gains for candidate cell combination. UEs that are close to a cell border in a non-combined scenario typically experience a high degree of interference from neighboring cells, i.e. the SINR is generally high. After a cell combination with any of these neighboring cells, such interference with the cells participating in the combination will vanish, since the present transmission point and the previously neighboring transmission point then transmits the same "useful" signal. A SINR gain is achieved. This gain is in the present disclosure referred to as a geometry gain. From user equipment reported signal strength and cell relations, it is possible by conventional prior art algorithms to estimate what geometry gain will be achieved for a certain cell combination. Therefore, in one embodiment, the network statistics that is obtained further comprises user equipment reported signal strength and cell relation. The cell combination that is to be recommended for the cell combination process, i.e. the "first" cell combination mentioned further above, is chosen further based on a geometry gain measure deduced from the UE reported signal strength and cell relation for each of the at least one candidate cell combination.

In a further particular embodiment, a cell combination, for which a sum of the load margin and such an associated gain geometry measure exceeds zero, also is allowed to be chosen as the first cell combination. In other words, for each selected candidates of cell combinations, it is calculated if achievable geometry gains, i.e. SINR gains, can compensated for the "loss" of bandwidth (e.g. N-n given that N cells are merged into n cells) and that resulting combined cell load is feasible.

Furthermore, if there is more than one candidate cell combination, the geometry gain can be estimated by calculating the geometry gain measure for all candidates. The first cell combination may in a particular embodiment then be selected as the candidate cell combination having the highest associated sum of the load margin and the associated geometry gain measure.

The cell combination to be recommended for the cell combination process can also be found by weighting a possible geometry gain against other properties. This can be done e.g. with cost functions. For example, reduction in handover interruption time can be weighted towards user throughput given known quality of experience functions, which may be influenced e.g. by the geometry gain. In other words, first cell combination, i.e. the cell combination that is intended to be the subject of the cell combination procedure, is selected as the candidate cell combination having the highest associated value of a predetermined weighted user quality based on the mobility measure, the load margin and said the geometry measure.

After the recommendation and preferably the performing of the cell combination, the process may stop. However, in a preferred embodiment, after the completing of the above described process, the process of evaluating and recommending cell combinations starts all over again, optionally with a certain waiting time. However, in order not to load the processing capacity and/or internal communication unnecessarily, this repetition may also in particular embodiments be interrupted by certain criteria. For instance, the combination of cells can be stopped at certain thresholds, such as after a certain number of cells have been combined within a cell cluster. An alternative threshold is e.g. to continue cell combination up to when a certain number of cells are combined within each combination.

As used herein, the non-limiting terms "User Equipment" and "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, customer premises equipment (CPE) laptop embedded equipment (LEE) laptop mounted equipment (LME) Universal Serial Bus (USB) dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

The above method is intended to be performed in a radio network node. In general, as used herein, the non-limiting term "radio network node" may refer to base stations, network control nodes such as network controllers, radio network controllers, base station controllers, and the like. In particular, the term "base station" may encompass different types of radio base stations (RBSs) including standardized base stations such as Node Bs, or evolved Node Bs, eNBs, and also macro/micro/pico radio base stations, home base stations, also known as femto base stations, relay nodes, repeaters, radio access points, base transceiver stations (BTSs), and even radio control nodes controlling one or more RRUs, or the like.

In a particular LTE-based embodiment, the radio network node performing the method is an eNB. In a particular Wideband Code Division Multiple Access (WCDMA) based embodiment, the radio network node performing the method is a NodeB. However, in alternative embodiments, the radio network node can be a more central node handling more than one nodeB. Non-exclusive examples are a Radio Resource Management (RRM) server or an Radio Network Controller (RNC). How the actual implementation is made depends strongly on the radio access technology and the physical design of the cellular system. The method is applicable to most radio technologies, and in particular embodiments to systems based on LTE, WCDMA or High-Speed Packet Access (HSPA).

Figure 3A:
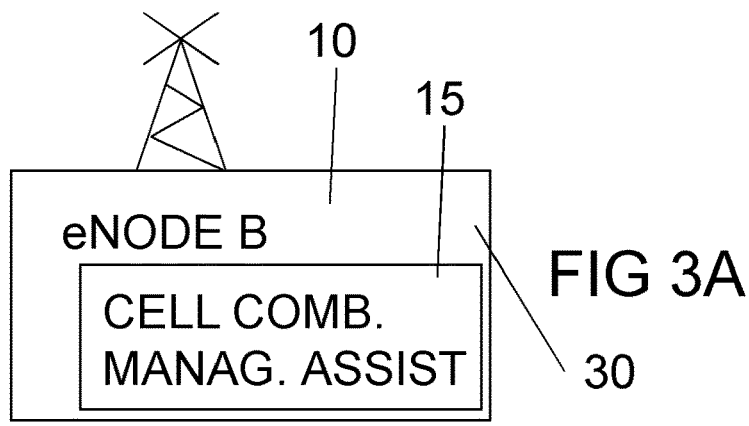
FIGS. 3A-3D are schematic illustrations of embodiments of communication systems comprising network nodes configured to assist in cell combination management.

FIG. 3A illustrates an embodiment of a system, typically an LTE-based system, having a base station 10 or eNB, comprising a subnode or arrangement 15 for assisting in cell combination management. The recommendations for cell combination of the arrangement 15 for assisting in cell combination management may be performed by the arrangement 15 for assisting in cell combination management itself or by any other part of the eNB 10. The eNodeB here constitutes a network node 30 configured to assisting in cell combination management.

Figure 3B:
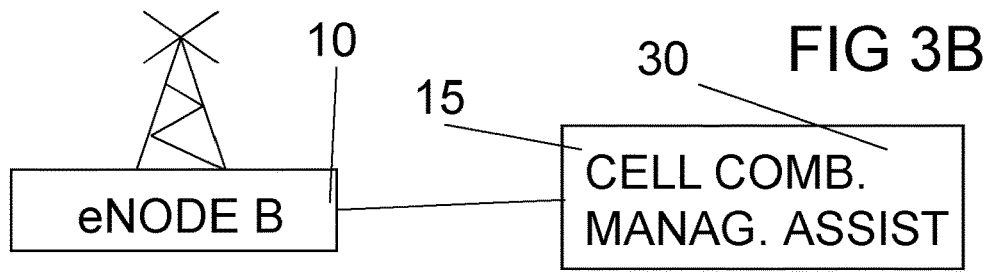

FIG. 3B illustrates an embodiment of another system, in which the arrangement 15 for assisting in cell combination management is communicationally connected to the eNB 10. In this embodiment, the arrangement 15 for assisting in cell combination management has no authority to actually perform the cell combination. Instead, the recommendation is provided to the eNB 10, which makes the final decision and if approved, performs the cell combination. The arrangement 15 for assisting in cell combination management here constitutes a network node 30 configured to assisting in cell combination management.

Figure 3C:
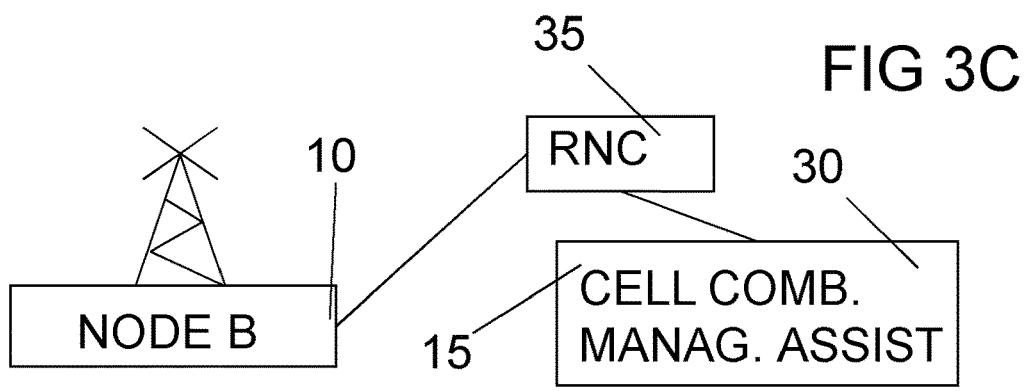

FIG. 3C illustrates an embodiment of another system, in which the arrangement 15 for assisting in cell combination management is communicationally connected to another network node, in this particular embodiment an RNC 35 in a WCDMA system, having the authority to control cell combining concerning a number of NodeBs 10. In this embodiment, the arrangement 15 for assisting in cell combination management has no authority to actually perform the cell combination. Instead, the recommendation is provided to the RNC 35, which makes the final decision and if approved, performs the cell combination. Also here, the arrangement 15 for assisting in cell combination management here constitutes a network node configured to assisting in cell combination management.

Figure 3D:
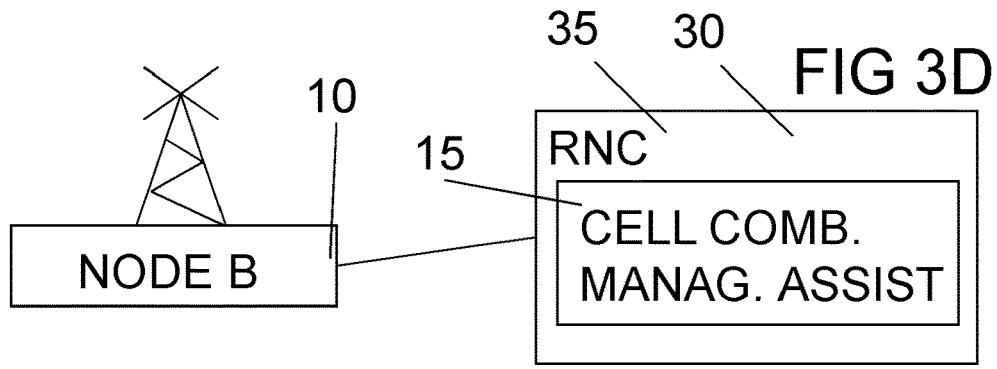

FIG. 3D illustrates another embodiment, in which an RNC 35 is responsible for the cell combination. In this embodiment, the arrangement 15 for assisting in cell combination management is provided in the RNC 35, whereby the decision and performance of the cell combining can be made directly within the same node. The RNC 35 here constitutes a network node 30 configured to assisting in cell combination management.

Optionally, the network node may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

The proposed technology provides a network node in a cellular communication system configured to assist in cell combination management. To this end, the network node is configured to obtain network statistics. The network statistics comprises mobility statistics associated with pairs of cells in the cellular communication system as well as cell loads of cells in the cellular communication system. The network node is configured to select at least one candidate cell combination. The candidate cell combination is a combination of cells for which a mobility measure deduced from the mobility statistics for pairs of cells participating in the combination of cells exceeds a first predetermined threshold. The network node is further configured to determine a total load capacity for each of the at least one candidate cell combination and to recommend a cell combination procedure for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular embodiment, the network node comprises communication circuitry configured to obtain network statistics.

In a particular embodiment, the network node is a control node. The network node is then further configured to perform the cell combination procedure according to the recommending.

In a particular embodiment, the network node comprises a processor and a memory, whereby the memory comprising instructions executable by the processor. The processor is operative to select at least one candidate cell combination, to determine a total load capacity for each of the at least one candidate cell combination, and to recommend a cell combination procedure for a first cell combination out of the candidate cell combinations.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

Figure 4:
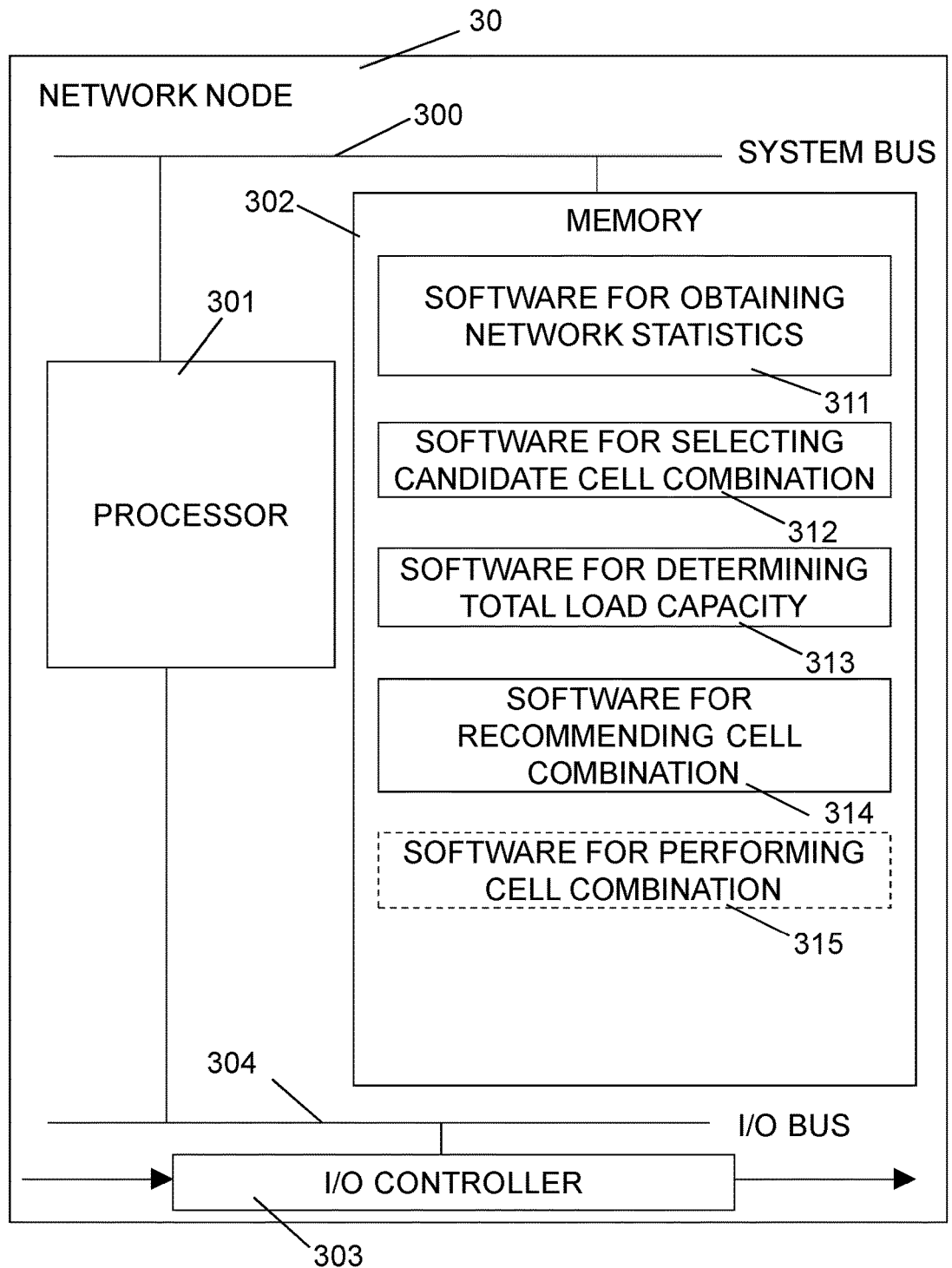
FIG. 4 is a schematic block diagram of an embodiment of a network node configured to assist in cell combination management.

FIG. 4 is a schematic block diagram illustrating an example of a network node 30 for assisting in cell combination management comprising a processor 301 and an associated memory 302. The network node 30 comprises an input, illustrated as an I/O bus 304 and an I/O controller 303. The network node 30 further comprises a system bus 300 for communication between the different parts. The memory 302 comprises instructions, illustrated as software entities 311-314; software for obtaining network statistics, software for selecting candidate cell combination, software for determining total load capacity and software for recommending cell combination. In a particular embodiment, the memory 302 further comprises instructions, illustrated as software entity 315; software for performing cell combination. The instructions are executable by the processor 301 whereby the network node 30 is operative to assisting in cell combination management. The network statistics is at least to a part received from other network nodes via the input, in this embodiment the I/O bus 304 and the I/O controller 303.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment of a computer program for assisting in in cell combination management, the computer program comprises instructions, which when executed by at least one processor, cause the at least one processor to obtain network statistics for a cellular communication system. The network statistics comprising mobility statistics associated with pairs of cells in the cellular communication system as well as cell loads of cells in the cellular communication system. The computer program comprises further instructions, which when executed by the processor, cause the processor to select at least one candidate cell combination. The candidate cell combination is a combination of cells for which a mobility measure deduced from the mobility statistics for pairs of cells participating in the combination of cells exceeds a first predetermined threshold. The computer program comprises further instructions, which when executed by the processor, cause the processor to determine a total load capacity for each of the at least one candidate cell combination. The computer program comprises further instructions, which when executed by the processor, cause the processor to recommend a cell combination procedure for a first cell combination out of said candidate cell combinations. The cell combination, for which a load margin exceeds zero, is allowed to be chosen as the first cell combination. The load margin is a difference between said determined total load capacity for the first cell combination and a sum of said cell loads of cells of the first cell combination.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a USB memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

One particular example of a process according to the proposed technology is presented in order to increase the understanding of the advantages. In this particular embodiment a cellular system covering a railway station is considered.

| Combined HO relations | Merged Cell load [user/h] | Fraction non-comb, top cell load | Decrease in HO [%] | Geometry (links with no interferer) for platforms | | | | |
|---|---|---|---|---|---|---|---|---|
| | | | | A [%] | B [%] | C [%] | D [%] | E [%] |
| 1-2-3 | 33 | 2.0 | 26 | 24 | 17 | 27 | | |
| 1-2-4 | 31 | 1.9 | 6 | | | | | |
| 1-2-6 | 34 | 2.0 | 41 | 9 | 11 | 20 | | |
| 1-3-4 | 26 | 1.5 | 0 | | | | | |
| 1-3-5 | 30 | 1.8 | 4 | | | | | |
| 1-3-6 | 29 | 1.7 | 0 | | | | | |
| 1-4-5 | 28 | 1.6 | 10 | | | | 29 | 62 |
| 1-4-6 | 27 | 1.6 | 12 | | | | | |
| 1-2-5 | 35 | 2.1 | 4 | | | | 18 | 35 |
| 1-5-6 | 31 | 1.8 | 2 | | | | | 35 |
| 2-3-4 | 37 | 2.2 | 32 | 24 | 17 | 27 | | |
| 2-3-5 | 41 | 2.5 | 32 | 24 | 17 | 27 | | |
| 2-3-6 | 40 | 2.4 | 67 | 42 | 40 | 47 | | |
| 2-4-5 | 39 | 2.3 | 18 | | | | 18 | 22 |
| 2-4-6 | 38 | 2.3 | 59 | 9 | 11 | 20 | | |
| 2-5-6 | 42 | 2.5 | 45 | 9 | 11 | 20 | | |
| 3-4-5 | 34 | 2.0 | 9 | | | | | |
| 3-4-6 | 32 | 1.9 | 12 | | | | | |
| 3-5-6 | 37 | 2.2 | 2 | | | | | |
| 4-5-6 | 34 | 2.1 | 19 | | | | 15 | 22 |

Table 1. Cell load, relative handover reduction and geometry gains in terms of increased amount of single-cell samples given selected cell clustering at an exemplifying train station small cell active DAS installation.

Network statistics describing load, such as e.g. the number of users per time unit, corresponding mobility in terms of between cells and UE-reported cell relations/strengths are quantities available from radio networks operation nodes.

The time scale can be per minute, hour, weekday, etc., reflecting essential traffic patterns.

The Work flow may start with identifying busiest cells in terms of mobility/handover to select cells that combination thereof has biggest potential of reducing the amount of handovers, hence reducing signaling load on X2 interface. I.e. pick highest HO-reduction numbers in column 4 in Table 1 as candidate cell combinations.

Figure 5A:
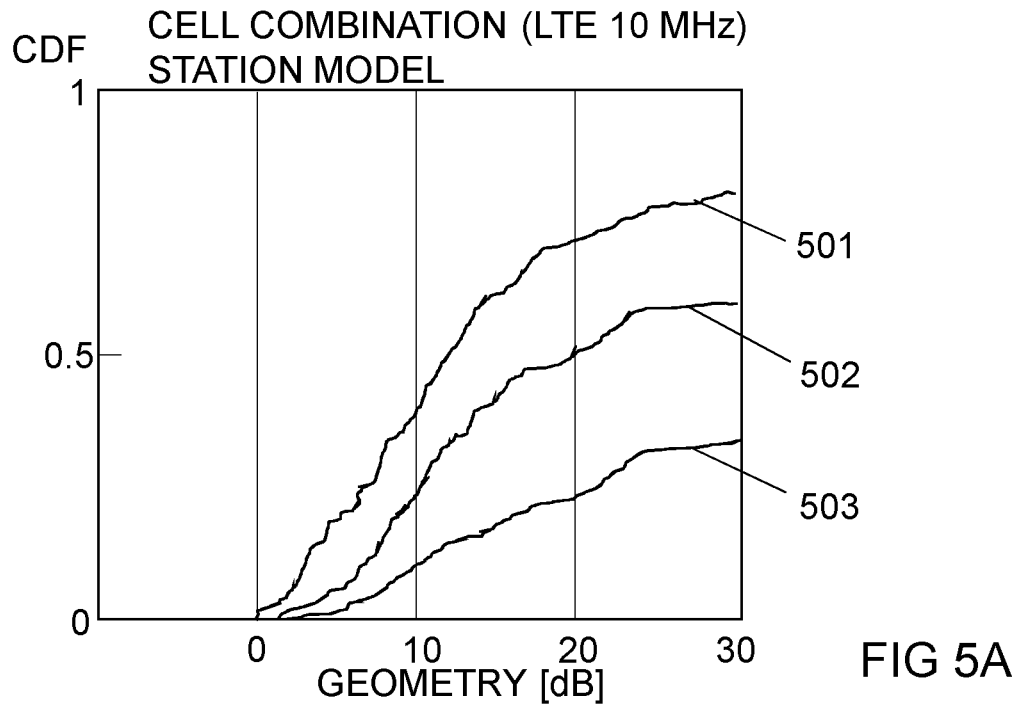
FIG. 5A is a diagram illustrating achievable geometry gains given certain small cell clustering at an exemplifying train station small cell active DAS installation.
Figure 5B:
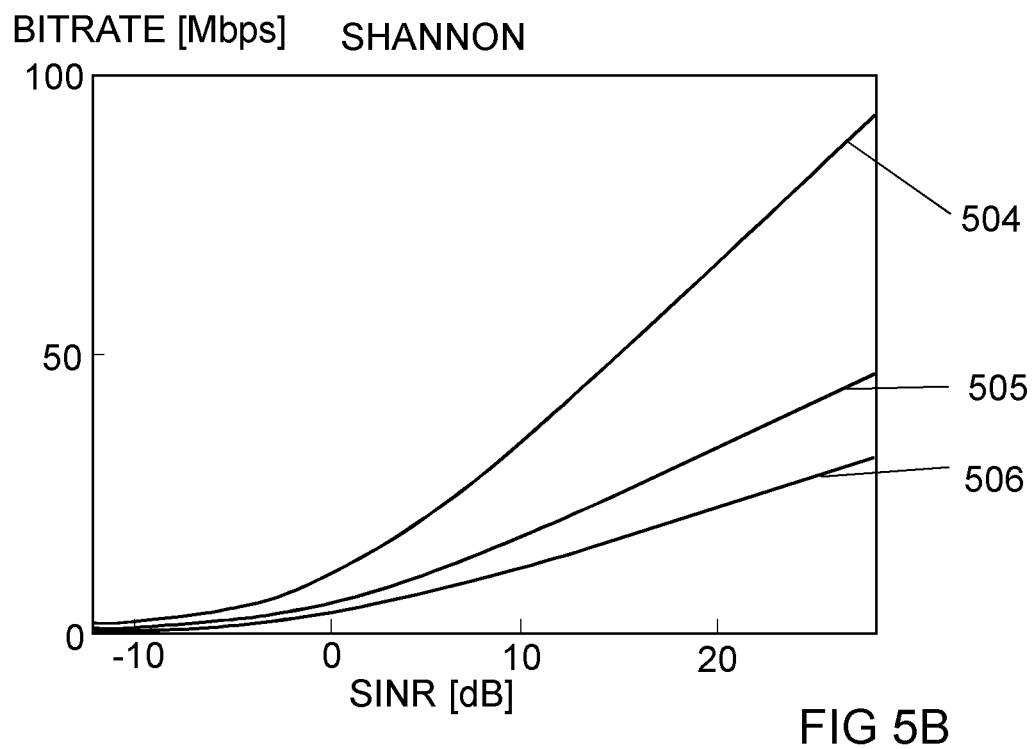
FIG. 5B is a diagram illustrating Shannon's classical SINR-to-throughput equation as a figure showing Signal to Interference and Noise ratio (SINR) required maintaining user throughput given a loss of transmission bandwidth.

With UE-reported cell relations/strengths achieved from system network logs, cells' radio-wise overlaps being non-clustered (as decision baseline) and all possible clustering combinations (up to and including e.g. pairs, triplets or quadruplets, etc.) is calculated. See FIG. 5A. In FIG. 5A, the achievable geometry (i.e. SINR) gains are presented given certain small cell clustering at an exemplifying train station small cell active DAS installation. Curve 501 represents baseline with no cells clustered, and curves 502 and 503 represent different cell combinations. Shannon's classical SINR-to-throughput equation is illustrated in FIG. 5B; curve 504 corresponds to 100% bandwidth, curve 505 and curve 506 correspond to throughput achieved given 50% and 33% transmission bandwidth. Assuming e.g. clustering of two cells into one cell, i.e. two transmission points merged into one transmission point, the resulting bandwidth correspond to the "50%" curve 505. Combination of FIGS. 5A and 5B can judge if a certain cell combination will be advantageous or not in that obtainable geometry (i.e. SINR) gain from a specific action (e.g. curve 501 to curve 502, at a specific geometry levels or percentile) can be compared to corresponding Shannon curves (e.g. curves 504 and 505). In this example, proposed clustering will be advantageous if achieved cell clustering gain in SINR surpasses the Shannon requirement for maintained bitrate.

The procedure continues by select candidate cell combinations from cells to form clusters that fulfill specified selection criteria. Typically such criteria concerns being frequent in handover relation with one or several cells, e.g. more frequent than a specific first threshold. The particular cell combination to recommend is then chosen as a cell combination having the property that users within these cells in the set of detected neighbor (or serving) cells will achieve a geometry gain larger than a specified second threshold as the mentioned set of cells are combined/clustered. For the selected set of cells, calculate if achievable geometry gains can compensate for the "loss" of bandwidth (e.g. N-n given that N cells are merged into n cells) and that resulting combined cell load is feasible.

In this particular embodiment, for the purpose of evaluation, depending on fulfillment of constraints, cell clusters may be classified as good, average or poor, or similar. Depending on this classification, suggested clusters can be approved or disapproved to be recommended for cell combining.

Figure 6A:
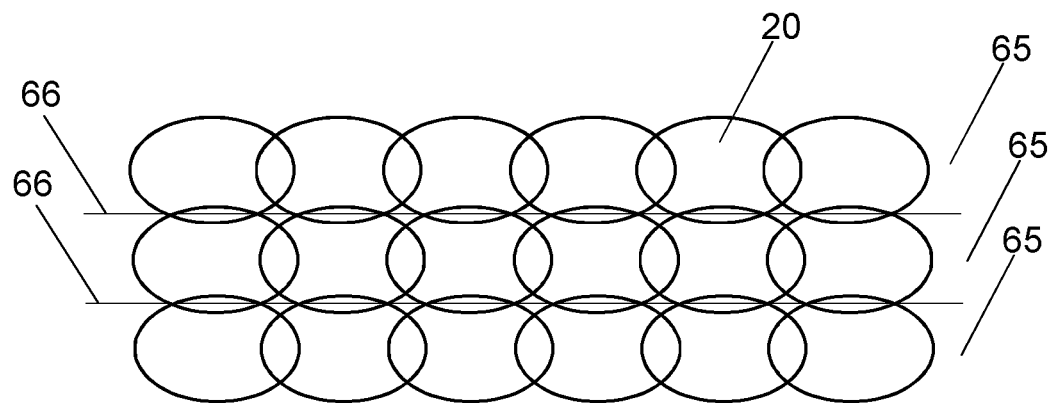
FIGS. 6A and 6B illustrate an embodiment of a cell configuration at a train station before and after, respectively, a cell combination procedure.
Figure 6B:
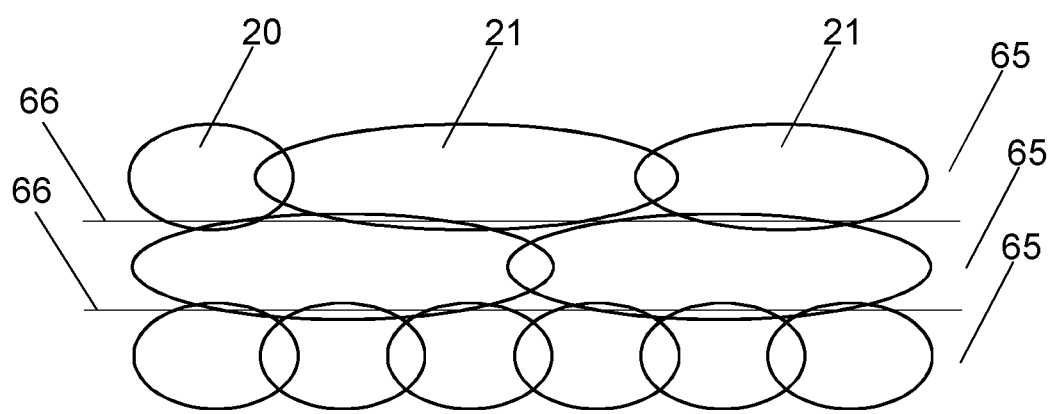

A train station with a cellular communication system adapted to the platforms is a typical example of a system where the intended movements of the users are performed in certain directions and according to certain schedules. Other examples of such systems may e.g. be highways or other types of restricted traveling routes. In FIG. 6A, a schematic cell plan of a train station is illustrated. The cells 20 cover each a part of a single platform 65, separated by tracks 66. When a train is to arrive or leave, the movement of the UEs on the corresponding platform typically increase, which also increases the number of handovers. The movements are also performed in well-defined direction, i.e. along the platforms. FIG. 6B, a plausible cell combination situation is illustrated when trains are expected to stop at the two topmost platforms. Cell combinations are made along the platforms, since this reflect the direction of movements. However, no cell combination across the trails is made. Also the bottom platform is unchanged, since the moving activity of UEs is expected to be low. The actual combining of the cells differ between the two upper platforms due to differences in motion patterns of UEs.

Figure 7:
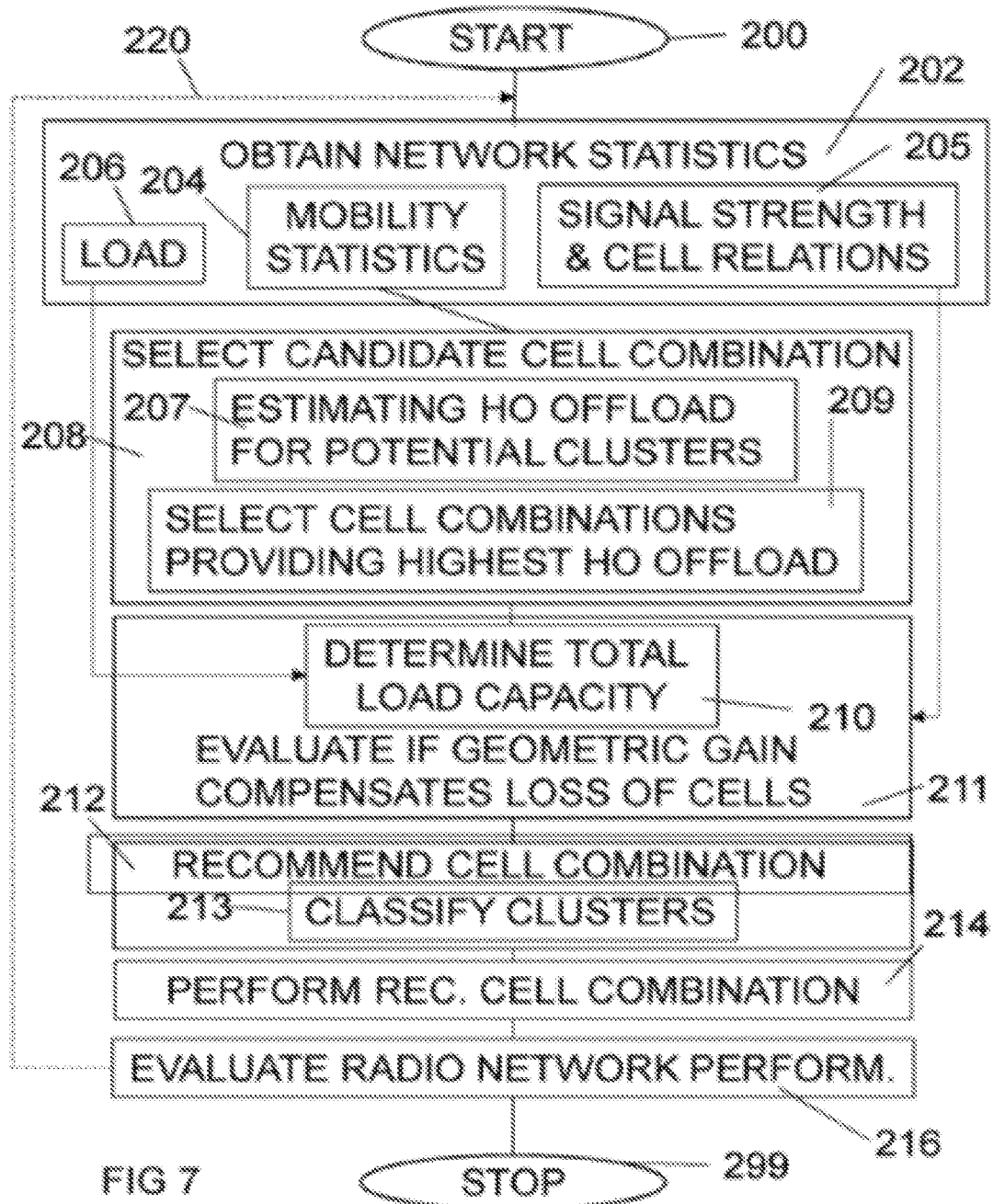
FIG. 7 is a flow diagram of steps of another embodiment of a method for assisting in cell combination management.

The process is schematically illustrated in FIG. 7. The process starts in step 200. In step 202, network statistics are obtained, e.g. collected. In this embodiment, the network statistics comprises cell load 206, mobility statistics 204 and UE reported signal strength and cell relations 205. Step 208, comprises the two part steps. Step 207 comprises estimating of HO offload for potential cell clusters. In step 209, cell combinations providing the highest HO offload, are selected, e.g. by comparing the HO offload with a first threshold. In step 211, it is evaluated if SINR gain or geometric gain from clustering of certain candidate cell combinations is sufficient for compensating for loss of cells and if the resulting load in the combined cell is feasible. This step 211 comprises the step 210 of determining a total load capacity of a candidate cell combination. Step 212 comprises in this embodiment a step 213, in which candidate cell clusters are classified, in order to facilitate the decision whether or not they are allowed to be recommended for a cell combination procedure. In a particular embodiment, the classification can be performed into three classes, one where the total cell load is acceptable and where a capacity gain is larger than a predetermined threshold, one where the total cell load is acceptable but the capacity gain just acceptable, and one where either the total cell load or the capacity gain is unacceptable. The present embodiment also has an evaluating step 216, in which the radio network performance after the performed cell combinations is evaluated. The process may then return to step 202 as indicated by the dashed arrow 220.

In a further embodiment also other external factors can be used in the decisions about cell combination. In the particular case of systems involving areas where people move differently in different times, external traffic monitoring characteristics can further be used. Thus, In a further embodiment, input on traffic and mobility characteristics reflecting hourly, daily, weekly, etc. traffic patterns that a clustering algorithm could exploit to predict or schedule mobility variations, can be achieved from external sources of information. For example, transport system traffic steering/monitoring/control system for trains, busses, aircrafts or ships/ferries, may for example show information on time tables and corresponding amount of passengers traveling in specified directions at which hours, fraction embarking/disembarking at specific stations, traffic light/control scheduling schemes, traffic jam info, etc. Such information can then be entered into the previously described procedures. Such information may e.g. result in time-dependent modifications to the threshold that are used. Another possibility is to use such external information to make selections among which cells that should be monitored at all. Cells only covering a train station having negligible traffic e.g. during the night may not be very interesting for making the analysis at all. In other words, in a particular embodiment, the method comprises the further step of gathering transport system statistics. The combination of cells that are selectable as candidate cell combinations are then determined in dependence also of the transport system statistics.

Figure 8:
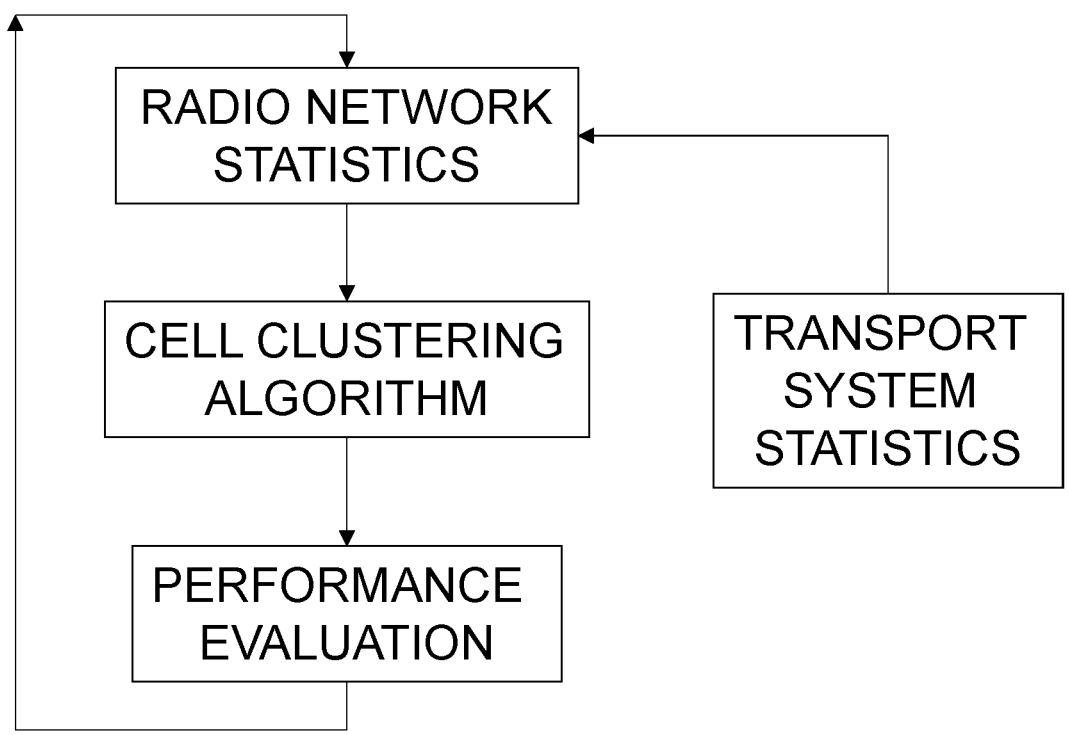
FIG. 8 is a flow diagram illustrating use of transport system statistics.

Such an approach may advantageously be combined with an evaluation approach. This is schematically illustrated in FIG. 8. Radio network statistics is collected and combined with transport system statistics, e.g. time tables, amount of passengers, fraction of embarking/disembarking, traffic light scheduling schemes, traffic jam information etc. This total information is entered into a cell clustering algorithm, resulting in certain rearrangements of cell combinations. The performance of the new situation is then evaluated, and the entire process may start all over again. In other words, in a particular embodiment, the method for assisting in cell combination comprises the further step of evaluating radio network performance before and after the cell combination procedure. In a further particular embodiment, the step of recommending a cell combination procedure for a first cell combination is performed in further dependency of radio network performance before and after previous cell combination procedures.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in the memory may thus be organized as appropriate function modules configured to perform, when executed by the processor, at least part of the steps and/or tasks described herein. An example of such function modules is illustrated in FIG. 9.

Figure 9:
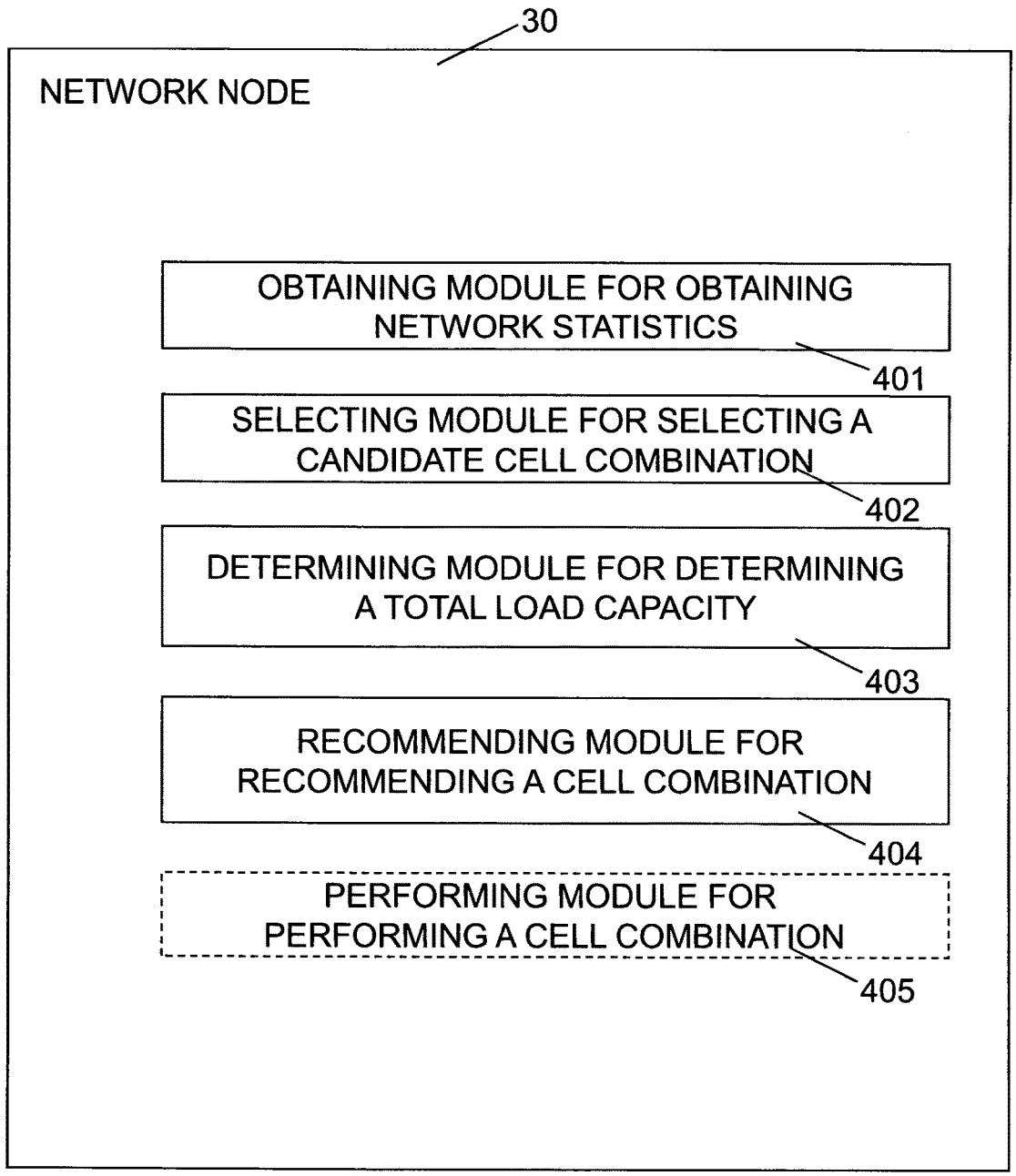
FIG. 9 is a schematic block diagram illustrating an embodiment of a network node comprising a group of function modules.

FIG. 9 is a schematic block diagram illustrating an example of a network node 30 comprising a group of function modules. The network node 30 comprises an obtaining module 401 for obtaining network statistics. The network statistics comprising mobility statistics associated with pairs of cells in the cellular communication system as well as cell loads of cells in the cellular communication system. The network node 30 further comprises a selecting module 402 for selecting at least one candidate cell combination. The candidate cell combination is a combination of cells for which a mobility measure deduced from the mobility statistics for pairs of cells participating in the combination of cells exceeds a first predetermined threshold. The network node 30 further comprises a determining module 403 for determining a total load capacity for each of the at least one candidate cell combination and a recommendation module 404 for recommending a cell combination procedure for a first cell combination out of the candidate cell combinations. A cell combination, for which a load margin exceeds zero, is allowed to be chosen as the first cell combination. The load margin is a difference between the determined total load capacity for the first cell combination and a sum of the cell loads of cells of the first cell combination. In a particular embodiment, the network node 30 further comprises a performing module 405 for performing a cell combination.

Alternatively it is possibly to realize the modules in FIG. 8 predominantly by hardware modules, or alternatively by hardware. The extent of software versus hardware is purely implementation selection.

The proposed technology presented here above, has a number of advantages. A network node in a wireless network for handling transmission between UEs and at least two transmission points, may utilize a method comprising obtaining of mobility statistics, e.g. handover statistics, for each transmission point pair relation and creation of one or more cells based on the mobility statistics. The handover statistics is preferably one or more of; number of handover, number of handover failures, handover interruption time or handover signaling load. For one or several of the embodiments, the amount of handovers between the involved cells is reduced and the related signaling load over the interface between LTE eNBs (X2) therefore also is reduced. Hence, HO-failures related KPIs are improved.

Furthermore, for one or several of the embodiments, radio network capacity is improved and end user performance is improved as a consequence of lower interference, i.e. better cell isolation.

The actual mobility and handover performance in each scenario takes into account mobility pattern including mobile speed identifying most important cell-combinations.

The user experienced quality can be improved rather than a single KPI by combining handover statistics with load.

The described combined cell feature reduces planning cost by automated cell re-planning (in clustering) reflecting observed mobility patterns. In case of increased capacity needs, automatic cell split can be obtained.

Embodiments of the proposed technology also provides for adapting to time-varying traffic and mobility patterns.

In low loaded time periods, larger clusters could improve experienced quality by reducing handover interruptions and handover-related KPIs.

Embodiments of the proposed technology also improves system capacity and end user performance as a consequence of lower interference (better cell isolation) as worst overlapping adjacent cells potentially are removed.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

| Abbreviation | Explanation |
| --- | --- |
| ASIC | Application Specific Integrated Circuit |
| BTS | Base Transceiver Station |
| CD | Compact Disc |
| CoMP | Coordinated Multi Point |
| CPE | Customer Premises Equipment |
| CPU | Central Processing Unit |
| CSI-RS | Channel State Information Reference Signal |
| DAS | Distributed Antenna System |
| DMRS | Demodulation Reference Signal |
| DSP | Digital Signal Processor |
| DVD | Digital Versatile Disc |
| eNB | E-UTRAN Node B, a.k.a. Evolved Node B (i.e. RBS) |
| FPGA | Field Programmable Gate Array |
| HDD | Hard Disk Drive |
| HO | Handover |
| HSPA | High-Speed Packet Access |
| KPI | Key Performance Indicator |
| LEE | Laptop Embedded Equipment |
| LME | Laptop Mounted Equipment |
| LTE | Long Term Evolution |
| PC | Personal Computer |
| PDA | Personal Digital Assistant |
| PLC | Programmable Logic Controller |
| QoE | Quality of Experience |
| RAM | Random Access Memory |
| RBS | Radio Base Station |
| RDS | Radio Dot System |
| RNC | Radio Network Controller |
| ROM | Read-Only Memory |
| RRC | Radio Resource Control |

| Abbreviation | Explanation |
|---|---|
| RRM | Radio Resource Management |
| RRU | Remote Radio Unit |
| SINR | Signal to Interference and Noise ratio |
| TM9 | Transmission Mode 9 |
| UE | User Equipment |
| USB | Universal Serial Bus |
| WCDMA | Wideband Code Division Multiple Access |
| X2 | Interface between LTE eNBs |

The invention claimed is:

1. A method for assisting in cell combination management in a cellular communication system, wherein said method comprises the steps of:
   obtaining network statistics;
   said network statistics comprising mobility statistics associated with pairs of cells in said cellular communication system as well as cell loads of cells in said cellular communication system;
   selecting at least one candidate cell combination;
   said candidate cell combination being a combination of cells for which a mobility measure deduced from said mobility statistics for pairs of cells participating in said combination of cells exceeds a first predetermined threshold;
   determining a total load capacity for each of said at least one candidate cell combination;
   recommending a cell combination procedure for a first cell combination out of said candidate cell combinations;
   whereby a cell combination, for which a load margin exceeds zero, is allowed to be chosen as said first cell combination;
   said load margin being a difference between said determined total load capacity for said first cell combination and a sum of said cell loads of cells of said first cell combination,
   characterized in that said network statistics further comprises user equipment reported signal strength and cell relation, whereby said first cell combination is chosen further based on a geometry gain measure deduced from said UE reported signal strength and cell relation for each of said at least one candidate cell combination; and
   gathering transport system statistics, whereby combination of cells being selectable as candidate cell combinations are determined in dependence of said transport system statistics; and wherein said transport system statistics includes time tables, amount of passengers, fraction of embarking/disembarking, traffic light scheduling schemes and traffic jam information.

2. The method according to claim 1, characterized in that a cell combination, for which a sum of the load margin and an associated said geometry gain measure exceeds zero, also is allowed to be chosen as said first cell combination.

3. The method according to claim 2, characterized in that said first cell combination is selected as the candidate cell combination having the highest associated said sum of the load margin and an associated said geometry gain measure.

4. The method according to claim 2, characterized in that said first cell combination is selected as the candidate cell combination having the highest associated value of a predetermined weighted user quality based on said mobility measure, said load margin and said geometry gain measure.

5. The method according to claim 1, characterized in that said cell combination being a combination of at least two cells in said cellular communication system.

6. The method according to claim 1, characterized in that said mobility statistics comprises handover statistics.

7. The method according to claim 6, characterized in that said handover statistics comprises at least one of:
   number of handovers;
   handover rates;
   number of handover drops;
   handover air interface signaling load;
   RRC load;
   random access load;
   X2 signaling load; and
   handover interruption time.

8. The method according to claim 1, characterized in that said step of obtaining comprises collecting network statistics from network nodes in said cellular communication system.

9. The method according to claim 1, characterized by comprising the further step of performing said cell combination procedure according to said recommending.

10. The method according to claim 1, characterized by comprising the further step of evaluating radio network performance before and after said cell combination procedure.

11. The method according to claim 10, characterized in that said step of recommending a cell combination procedure for a first cell combination is performed in further dependency of radio network performance before and after previous cell combination procedures.

12. A network node in a cellular communication system configured to assist in cell combination management, the network node comprising:
   a processor;
   a communication circuitry; and
   a memory, wherein said memory comprising instructions executable by the processor,
   wherein said communication circuitry is configured to obtain network statistics;
   said network statistics comprising mobility statistics associated with pairs of cells in said cellular communication system as well as cell loads of cells in said cellular communication system;
   wherein the processor of said network node is configured to:
   select at least one candidate cell combination;
   said candidate cell combination being a combination of cells for which a mobility measure deduced from said mobility statistics for pairs of cells participating in said combination of cells exceeds a first predetermined threshold;
   determine a total load capacity for each of said at least one candidate cell combination;
   recommend a cell combination procedure for a first cell combination out of said candidate cell combinations;
   whereby a cell combination, for which a load margin exceeds zero, is allowed to be chosen as said first cell combination;
   said load margin being a difference between said determined total load capacity for said first cell combination and a sum of said cell loads of cells of said first cell combination,
   characterized in that said network statistics further comprises user equipment reported signal strength and cell relation, whereby said first cell combination is chosen further based on a geometry gain measure deduced from said UE reported signal strength and cell relation for each of said at least one candidate cell combination; and gather transport system statistics, whereby combination of cells being selectable as candidate cell combinations are determined in dependence of said transport system statistics; and wherein said transport system statistics includes time tables, amount of passengers, fraction of embarking/disembarking, traffic light scheduling schemes and traffic jam information.

13. The network node according to claim 12, characterized in that said network node is a control node and in that said network node is further configured to perform said cell combination procedure according to said recommending.

14. A non-transitory computer storage medium storing computer readable code which when executed by a processor of a network node causes the network node to perform a method for assisting in cell combination management, the method comprising:

obtain network statistics for a cellular communication system, said network statistics comprising mobility statistics associated with pairs of cells in said cellular communication system as well as cell loads of cells in said cellular communication system;

select at least one candidate cell combination, said candidate cell combination being a combination of cells for which a mobility measure deduced from said mobility statistics for pairs of cells participating in said combination of cells exceeds a first predetermined threshold;

determine a total load capacity for each of said at least one candidate cell combination;

recommend a cell combination procedure for a first cell combination out of said candidate cell combinations;

whereby a cell combination, for which a load margin exceeds zero, is allowed to be chosen as said first cell combination;

said load margin being a difference between said determined total load capacity for said first cell combination and a sum of said cell loads of cells of said first cell combination, characterized in that said network statistics further comprises user equipment reported signal strength and cell relation, whereby said first cell combination is chosen further based on a geometry gain measure deduced from said UE reported signal strength and cell relation for each of said at least one candidate cell combination; and gather transport system statistics, whereby combination of cells being selectable as candidate cell combinations are determined in dependence of said transport system statistics; and wherein said transport system statistics includes time tables, amount of passengers, fraction of embarking/disembarking, traffic light scheduling schemes and traffic jam information.

15. The non-transitory computer storage medium of claim 14, wherein the carrier is one of an electronic signal, an optical signal, an electromagnetic signal, a magnetic signal, an electric signal, a radio signal, a microwave signal, or a computer-readable storage medium.

* * * * *